(12) United States Patent
Cano (10) Patent No.: US 6,955,383 B2
(45) Date of Patent: Oct. 18, 2005

(54) RETRACTABLE OBJECT PROTECTIVE BARRIER

(76) Inventor: Larry Raymond Cano, 92 Hartford Dr., Newport Beach, CA (US) 92660

( * ) Notice: Subject to any disclaimer, the term of this patent is extended or adjusted under 35 U.S.C. 154(b) by 0 days.

(21) Appl. No.: 10/437,722

(22) Filed: May 13, 2003

(65) Prior Publication Data

US 2003/0209914 A1 Nov. 13, 2003

Related U.S. Application Data

(60) Provisional application No. 60/380,355, filed on May 13, 2002.

(51) Int. Cl.[7] ............................................. B60R 19/42
(52) U.S. Cl. ........................ 293/128; 293/127; D12/167
(58) Field of Search ....................... 293/18; 256/136.03, 256/136.02; 187/411; 180/274

(56) References Cited

U.S. PATENT DOCUMENTS

| | | | | |
|---|---|---|---|---|
| 3,243,223 A | * | 3/1966 | Hoshell ........................ 293/128 |
| 3,367,702 A | * | 2/1968 | Sauer ........................... 293/128 |
| 3,572,798 A | * | 3/1971 | Kunevicius ................... 293/128 |
| 3,659,887 A | * | 5/1972 | Marquette .................... 293/128 |
| 3,738,695 A | * | 6/1973 | McBee ......................... 293/128 |
| 3,752,521 A | * | 8/1973 | Lafebre ........................ 293/128 |
| 4,002,363 A | * | 1/1977 | James .......................... 293/128 |
| 4,401,331 A | * | 8/1983 | Ziner et al. .................. 293/128 |
| 4,437,697 A | * | 3/1984 | Hinojos ........................ 293/128 |
| 4,493,502 A | * | 1/1985 | Campbell, Jr. ............... 293/128 |
| 4,498,697 A | * | 2/1985 | McGlone et al. ............ 293/128 |
| 4,561,685 A | * | 12/1985 | Fischer ........................ 293/128 |
| 4,571,903 A | * | 2/1986 | Strassner ..................... 293/128 |
| 4,612,967 A | * | 9/1986 | Kamen et al. ......... 296/136.03 |
| 4,648,644 A | * | 3/1987 | Swanson et al. ............ 293/128 |
| 4,810,015 A | * | 3/1989 | McNeil ........................ 293/128 |
| 4,815,777 A | * | 3/1989 | Campbell .................... 293/128 |
| 4,828,303 A | * | 5/1989 | Soria ........................... 293/128 |
| 4,879,543 A | * | 11/1989 | Smith, Sr. .................... 293/128 |
| D308,661 S | * | 6/1990 | Bailey ......................... D12/167 |
| D309,593 S | * | 7/1990 | Bailey ......................... D12/167 |
| 4,958,881 A | * | 9/1990 | Piros ....................... 296/136.02 |
| 4,993,765 A | * | 2/1991 | Ryan ........................... 293/127 |
| 5,149,166 A | * | 9/1992 | Wille et al. .................. 293/128 |
| D338,647 S | * | 8/1993 | Bailey ......................... D12/167 |
| 5,267,763 A | * | 12/1993 | Klein ........................... 293/128 |
| 5,312,145 A | * | 5/1994 | McNeil ........................ 293/128 |
| 5,320,392 A | * | 6/1994 | Hart ............................. 293/128 |
| 5,333,923 A | * | 8/1994 | Whitfield .................... 293/128 |
| 5,335,951 A | * | 8/1994 | Neri et al. ................... 293/127 |
| 5,421,625 A | * | 6/1995 | Arko ........................... 293/128 |
| 5,685,712 A | * | 11/1997 | Fischer ......................... 433/26 |
| 5,799,992 A | * | 9/1998 | Kojima ........................ 293/128 |
| 5,879,037 A | * | 3/1999 | Batiste ......................... 293/128 |
| 5,881,845 A | * | 3/1999 | O'Donnell et al. ......... 187/411 |
| 5,956,918 A | * | 9/1999 | Wise ............................ 293/128 |
| 6,044,881 A | * | 4/2000 | Welch et al. .......... 296/136.02 |
| 6,056,347 A | * | 5/2000 | D'Adamo .............. 296/136.02 |
| 6,328,126 B2 | * | 12/2001 | Breed et al. ................. 180/274 |
| 6,736,435 B1 | * | 5/2004 | Ditthavong ................. 293/128 |

* cited by examiner

*Primary Examiner*—Kiran B. Patel (57) ABSTRACT

A device is disclosed that can be attached to a parked vehicle along its sides and protect the vehicle from dings or dents that might be caused by activity adjacent to the vehicle such as the opening and closing of the doors of an adjacent vehicle. The device has telescoping sections that allow it to be extended when it is attached to a vehicle. The device detachably connects to the vehicle and when not needed can be removed from the side of the vehicle and compacted for storage. In a preferred embodiment magnets are embedded in the device to allow it to detachably connect to the vehicle. Progressively smaller hollow telescoping sections of the device retract into the next larger section to achieve a compacted and easily stored device. An interlocking mechanism is incorporated into each section to prevent the sections of the device from becoming disjointed.

15 Claims, 6 Drawing Sheets

RETRACTABLE OBJECT PROTECTIVE BARRIER

RELATED APPLICATIONS

The present application claims priority under 35 USC §119(e) from U.S. provisional application Ser. No. 60/380,355, filed May 13, 2002 and entitled "Removable, Magnetized, Compactable, Plastic, Protective Vehicle Side Molding".

FIELD OF THE INVENTION

The present invention relates to devices for protecting an object from incidental damage and more particularly a compactable protective barrier that can be deployed and attached to an object, such as a motor vehicle, to be protected from damage when needed and the protective barrier can be removed, compacted and stored when it is not needed.

BACKGROUND OF THE INVENTION

Although most modern passenger automobiles and trucks are equipped with some type of permanent, fixed side molding, experience shows that the permanent molding can be non-effective for its intended purpose; that of adequately protecting a vehicle from damage to its paint and body by the careless and abrupt opening of a door of a vehicle parked next to it or damage which might be caused by activity adjacent to the vehicle. This is particularly the case while a vehicle is parked in a crowded parking lot, with small parking places. Smaller parking places are the result, especially in urban areas, of a premium on land dedicated to the parking of vehicles and are a phenomenon of the modern design of parking lots.

Thus what is needed is a device that will offer the owner's of automobiles, trucks, and other passenger vehicles the option of temporarily placing a device on the side of a vehicle in order to protect its body and paint while parked. The device should be capable of being removed without damage to the vehicle and compactable so it can be placed in the back seat or trunk for storage when not in use.

SUMMARY

It is an objective of the present invention to provide a compactable protective barrier for a vehicle while parked or an object when stored. It is a further objective to provide a protective barrier that can easily and efficiently attached to a vehicle when need and just as easily be removed when not needed. It is another objective to provide a barrier that cannot be easily stolen while attached to an unattended vehicle.

These and other objectives are achieved by providing a protective barrier for a parked vehicle, a multi sectioned telescoping device wherein each section interlocks into a larger section and is slidable between an open and closed position so that when the sections are all in the open position the device is fully deployed; and detachable securing mechanisms embedded in the multi sectioned telescoping device to allow it to be detachably connected to an object to be protected when the multi sectioned telescoping device is fully deployed. In a preferred embodiment the protective barrier has three sections. In yet another variation of the invention the protective barrier can have a cross-sectional shape of a triangle, square, circle, semicircle and an oval. In yet another aspect of the invention the sections of the protective barrier are hollow and of progressively smaller size so that each progressively smaller section can be inserted into the progressively next larger section to form the telescoping device.

BRIEF DESCRIPTION OF THE DRAWINGS

The invention will be better understood by an examination of the following description, together with the accompanying drawings, in which:

FIG. 6A is perspective of a section of the barrier that reveals the features of the interlocking mechanism;

FIG. 6B is view of the interlocking mechanism at IVB of FIG. 2;

DETAILED DESCRIPTION OF THE PREFERRED EMBODIMENT

Figure 1:
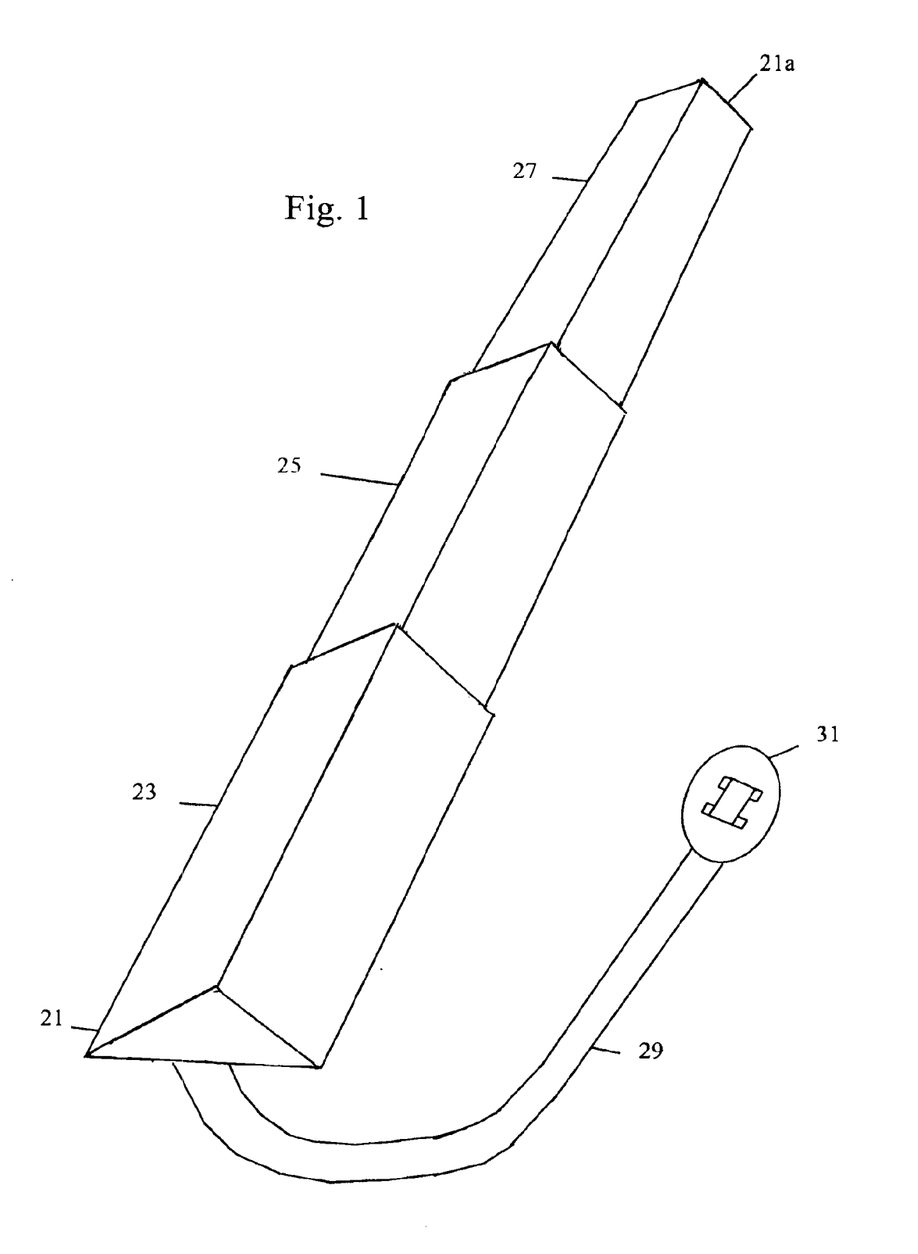
FIG. 1 is an orthogonal view of a preferred embodiment of the protective barrier in its elongated or deployed state.

As noted above the present invention provides a protective barrier 20 FIG. 1 that is temporarily placed on the side of a motor vehicle such as an automobile or truck, while parked, in order to protect the vehicle from receiving dings caused by the doors of adjacent vehicles when they are being opened or other activity adjacent to the vehicle. The barrier can be removed from the vehicle being protected compacted for storage when the vehicle is going to be driven.

In a preferred embodiment the protective barrier 20 of the present invention consists of three separate hollow sections, 23, 25 and 27 which in the preferred embodiment can be made of hard plastic or vinyl material, molded into a geometrical shape such as that of an equilateral triangle. Each section 23, 25 and 27 of the barrier in a preferred embodiment is approximately three feet in length and each is progressively smaller in size but not length, such that each section can be inserted, or telescoped into an adjoining larger section, in order to be compacted for storage when not in use or extended for deployment when ready for use. The cross-sectional shape of the barrier 20 can be circular, semi-circular, square or rectangular as well as that of a triangle as depicted in FIG. 1. In any ultimate shape or configuration, the feature of one section being able to be collapsed, inserted or telescoped into the adjoining, larger section for storage of the device will be present.

Figure 2:
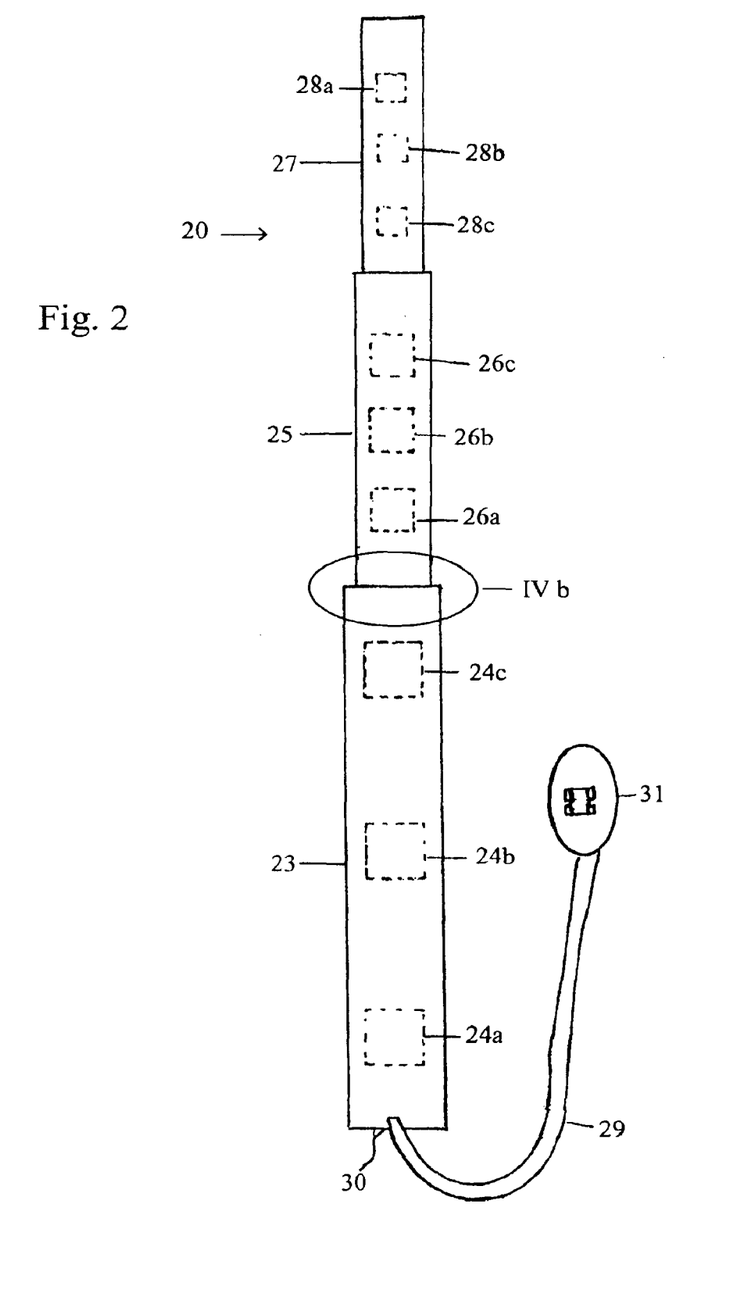
FIG. 2 is a view of the bottom of a preferred embodiment of the protective barrier in its elongated state.

In the preferred embodiment of the present invention each section 23, 25 and 27 have a series of magnets 24, 26 and 28 (FIG. 2) to secure the barrier to the side of a car or truck to protect it from dings or dents. Section 23 has magnets 24A, 24B and 24C, section 25 has magnets 26A, 26B and 26C and section 27 has magnets 28A, 28B and 28C. When fully deployed, i.e. each section has been moved to an open position as depicted in FIGS. 1 and 2, the barrier will then attach to a vehicle in a detachable fashion by means of the magnets located in each section.

Figure 11:
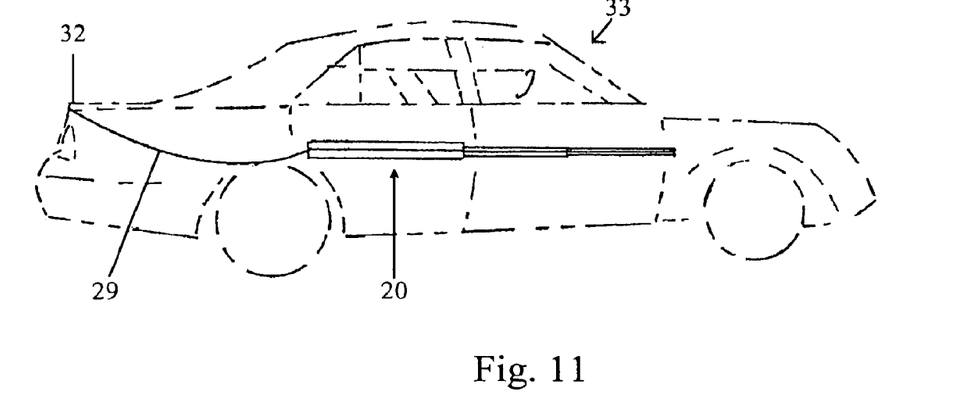
FIG. 11 is a side view of a vehicle on which the protective barrier has been deployed.
Figure 12:
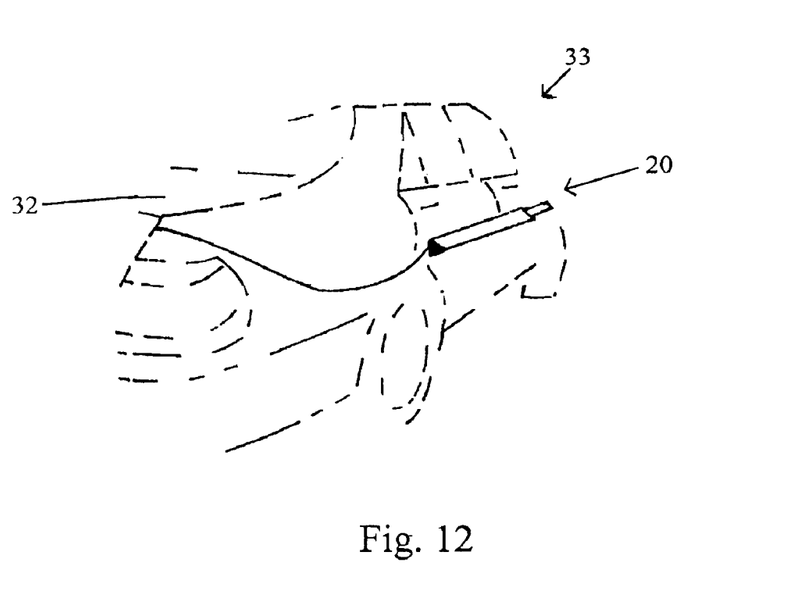
FIG. 12 is a perspective side view of a vehicle on which the protective barrier has been deployed.

The barrier has an anti-theft feature consisting of a security cord 29 (FIGS. 1 and 2) that attaches permanently at one end 30 to the barrier 20. The security cord 29 has a plate 31 attached to its opposite end. As depicted in FIGS. 11 and 12 when the barrier 20 is attached to a motor vehicle 33 the end of the security cable 29 with plate 31 is placed in the trunk 32 of the car and closed. This thus helps prevent someone from stealing the protective barrier 20 when it is deployed on a vehicle in a parking lot. Plate 31 at the end of cord 29 can also be closed in a window or door and the vehicle locked.

In a preferred embodiment the triangular configuration, the largest section 23 will measure approximately 3 inches per side of its equilateral triangular cross-section and be approximately three feet in length. The second section 25 will measure approximately 2½ inches per side of its equilateral triangular cross-section and also be approximately three feet in length. The third section 27 will measure approximately 2 inches per side of its equilateral triangular cross-section and also be approximately three feet in length. The sections 23, 25 and 27 when the barrier 20 is in the extended position will measure approximately 9 feet in length and therefore cover the side door panels of the average sized automobile, pickup truck or sports utility vehicle. The barrier can have other configurations depending on the type and size of vehicle with which it is designed to be used. It is anticipated that the device will be marketed in pairs to cover both sides of a vehicle when parked.

Although the present invention discloses a barrier with three telescoping sections it could be made with only two sections of appropriate length or more than three sections of appropriate length.

In the preferred embodiment the magnets 24A–24C, 26A–26C and 28A–28C are embedded under a layer of plastic or vinyl in each section 23, 25 and 27 as depicted in FIG. 2. Embedding the magnets in the material that makes up each section prevents the inadvertent scratching of paint by the magnets. Additionally, the series of magnets in the preferred embodiment will have a sufficient holding power to securely attach the barrier to a moving vehicle at a speed of 80 miles per hour, should a user forget to remove it prior to driving away from a parking place.

The utility of the barrier is such that, when temporarily affixed with magnets onto the outside of a vehicle, along the length of the vehicle, at a point where the side of a vehicle is widest, it will offer a cushion or barrier to protect the paint and body of a vehicle so that if a door of a vehicle parked next to it, is opened abruptly or carelessly, the opened door will make contact with the hard, plastic surface of the device and not the painted surface of a vehicle to which the device is attached.

Security strap or cable 29 in the preferred embodiment will be approximately four foot in length and one inch in width. Cable 29 will consist of thin nylon strap woven into a small highly flexible steel cable. The reinforced nylon construction will make the strap difficult for thieves or pranksters to cut and remove the barrier from the side of a parked vehicle. As noted above the opposite end of strap 29 will be affixed to an oval-shaped piece of hard plastic 31. The plate will be shut inside the vehicle either through a door, window or inside the trunk. Thus, when the vehicle is locked after deployment of the barrier this security feature will help prevent the device or barrier from being removed from the vehicle while the vehicle is parked.

Figure 3:
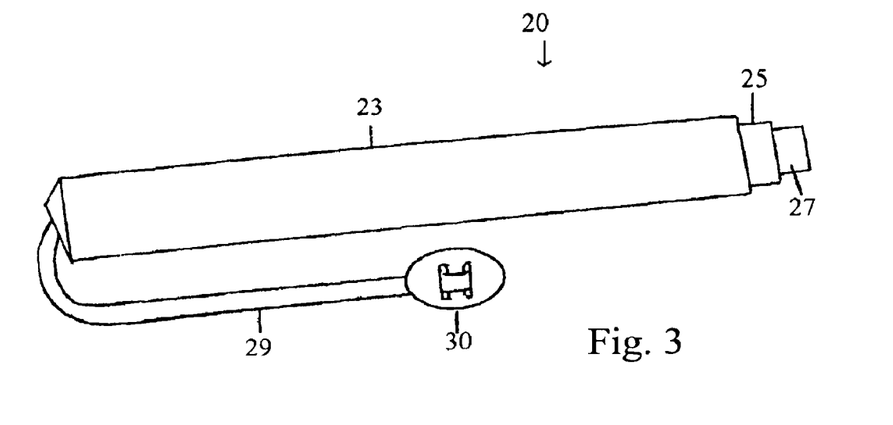
FIG. 3 is a perspective view from the side of a preferred embodiment of the protective barrier in its compacted position or configuration.
Figure 4:
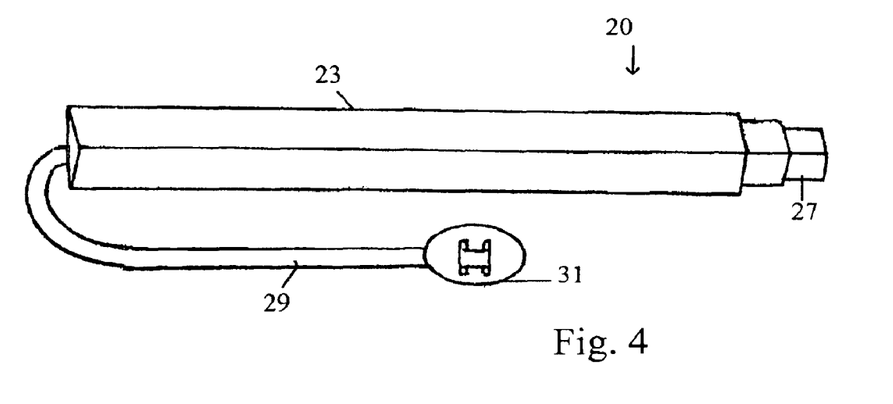
FIG. 4 is a top view of a preferred embodiment of the protective barrier in its compacted position or configuration.
Figure 5:
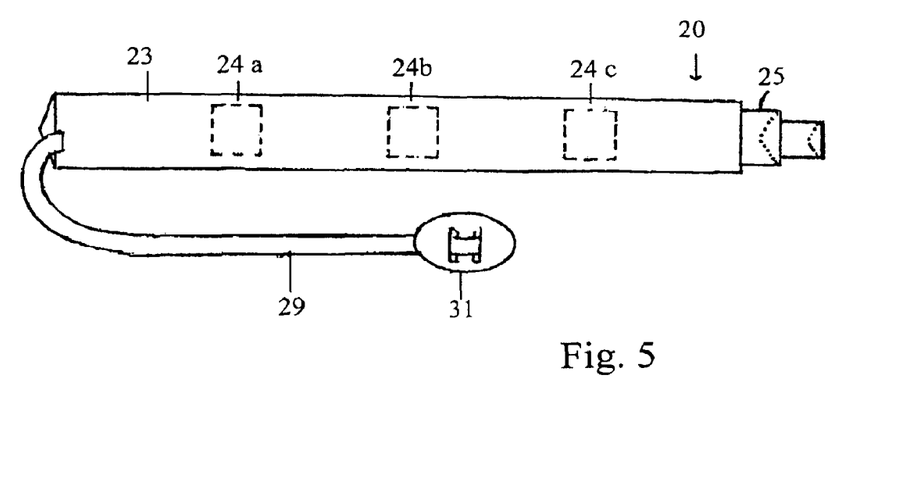
FIG. 5 is a bottom view of the protective barrier in its compacted position or configuration.

FIG. 3 is a perspective view from the side of the barrier 20 in its compacted position. The largest section 23 has middle section 25 inserted into and likewise smallest section 27 is inserted into section 25. FIG. 4 is a top view of the compacted barrier with all sections compacted together. FIG. 5 is a bottom view of the compacted barrier and magnets located under a layer of plastic or vinyl on the bottom of the largest section 23.

In order to prevent the sections from being completely pulled out of the next larger section into which it is inserted the barrier will have interlocking mechanisms in each section. The tips of each, section will be configured to form an interlocking mechanism in such a manner that when the device is fully extended, the sections will lock into one another so they cannot be pulled apart. This will be accomplished by configuring the adjoining end of the larger section to be closed to just slightly larger than the dimension of the smaller, adjoining section. The smaller, adjoining section will have a protrusion, outwardly projecting lip, or outwardly projecting flange in the shape of an equilateral triangle, or other geometric shape as may be manufactured, which is slightly larger than the section itself, yet not so large as to prevent it from sliding into the main cavity of the larger section. The inwardly projecting lip on the second or corresponding closed end of the adjoining larger section will, however, prevent the smaller section of the device from passing through the end of the larger section and thereby becoming disjoined and separated from its' adjoining larger section when fully extended. Thus, with the addition of each progressively smaller section in a larger section the telescoping feature of the barrier allows it to extend over a longer distance when all of the sections are in the fully open position but prevent them from falling out or being pulled out of the section into which they are inserted.

Figure 6:
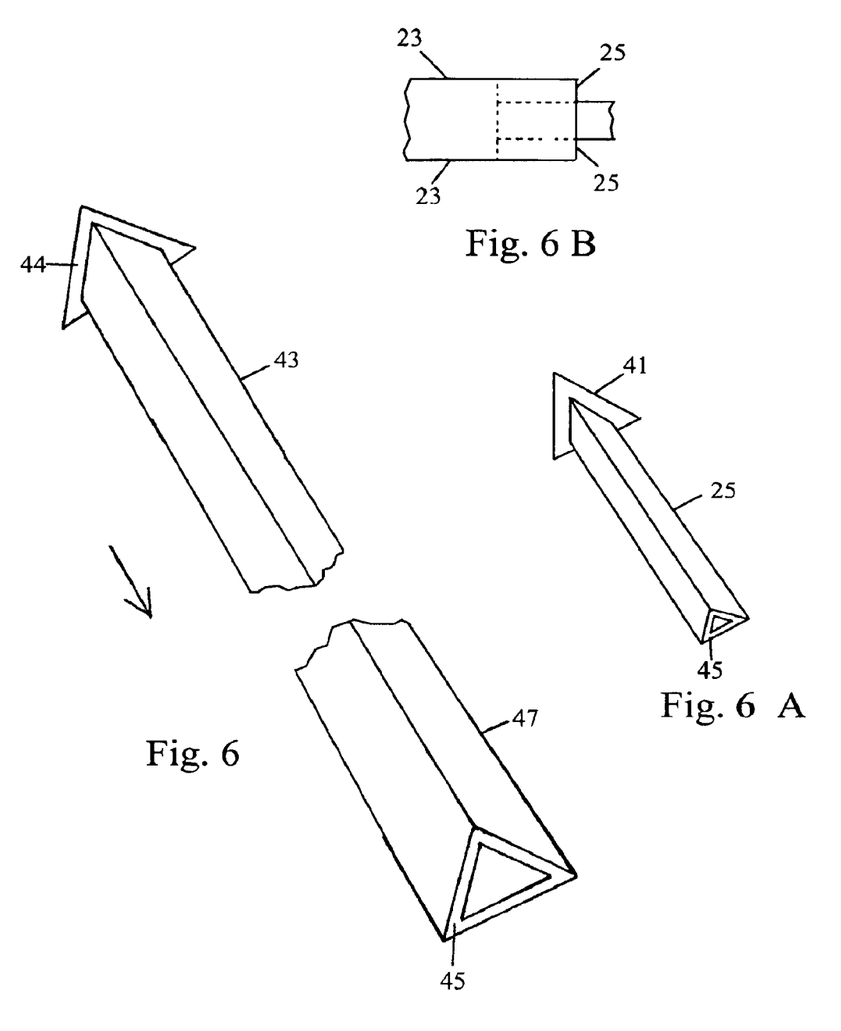
FIG. 6 is a perspective view of the ends of two sections of the device of the invention that shows a preferred embodiment of the sectional interlocking mechanism.

FIG. 6 is a perspective view of how the lip or outwardly projecting flange 41 on the front end of a smaller section 43 (in terms of the size of its equilateral triangle configuration or girth) would fit inside a larger section 47 and be stopped from coming out of the other end by virtue of an enclosure or inwardly projecting lip 45 on the end of larger section 47 which would allow the smaller section 43 to slip through the larger section 47 until the outwardly projecting flange 41 catches on inwardly projecting lip 45 and prevents the smaller section from slipping out the barrier from becoming disjointed.

The interlocking mechanism will thus limit movement of the smaller sections between a maximum open position as depicted in FIGS. 1 and 2 and a maximum closed position as depicted in FIGS. 3, 4 and 5. FIG. 6A provides a prospective view of how section 25 might appear, sections 23 and 27 having the same structures but being proportionally large or smaller as the case may be. In the preferred embodiment as noted above the interlocking mechanism thus consist of a protruding or outwardly projecting flange 41 at a first end of section 43 and an inwardly projecting lip 45 at a second end. As illustrated in FIG. 6B the first end with outwardly projecting flange 41 of a section, such as section 25 for example, will be positioned inside the second end of the next large section 23 adjacent to its inwardly projecting lip 45. Thus, inwardly projecting lip 45 of the next larger section will act as a block to outwardly projecting flange 41 of the next smaller section an limit maximum extension of the smaller section an prevent it from be pulled out or falling out of the next larger section into which it has been inserted.

Figure 7:
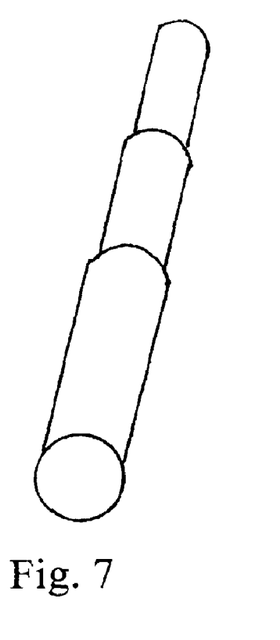
FIG. 7 is a perspective view of the protective barrier of the present invention configured in a cylindrical shape.
Figure 8:
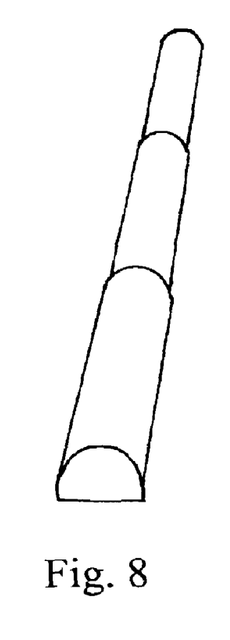
FIG. 8 is a perspective view of the protective barrier of the present invention configured in a semicircular shape.
Figure 9:
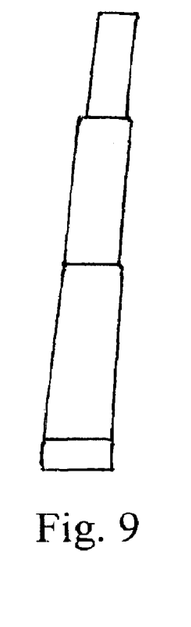
FIG. 9 is a perspective view of the protective barrier of the present invention configured in a rectangular shape.
Figure 10:
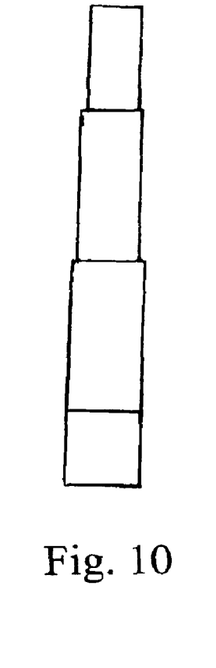
FIG. 10 is a perspective view of the protective barrier of the present invention configured in a square shape.

FIG. 7 shows a top perspective of the device or barrier in its extended position if configured in a circular configuration. The magnetized bottom section as well as the anti-theft strap and oval are not shown. FIG. 8 shows a top perspective of the device or barrier in its extended position if configured in a semi-circular configuration. The magnetized bottom section as well as the anti-theft strap and oval are not shown. FIG. 9 shows a top perspective of the device in its extended position if configured in a rectangular configuration. The magnetized bottom section as well as the anti-theft strap and oval are not shown. FIG. 10 shows a top perspective of the device in its extended position if configured in a square configuration. The magnetized bottom section as well as the anti-theft strap and oval are not shown.

FIG. 11 shows a side view of the device or barrier in its extended position when placed onto the side of a parked vehicle with its anti-theft strap in use. FIG. 12 shows another view from the back and side of a parked vehicle with the device or barrier placed onto the side of the vehicle with its anti-theft strap in use.

While the invention has been particularly shown and described with reference to a preferred embodiment thereof, it will be understood by those skilled in the art that various changes in form and detail may be made to it without departing from the spirit and scope of the invention.

What is claimed is:

1. A magnetically attachable protective barrier for a vehicle comprising:
   a. a multi-sectioned telescoping device wherein each section of the device includes respective walls having a determined wall thickness, and interlocks into a larger section and is slidable between an open and closed position so that when said sections are all in the open position the device is fully deployed; and
   b. plural magnets embedded in aligned walls of at least two sections of said multi-sectioned telescoping device to allow it to be detachably connected to a vehicle to be protected so that end portions of said telescoping sections may extend across and beyond a hinged door edge line of said vehicle when said multi sectioned telescoping device is fully deployed.

2. The protective barrier of claim 1 wherein the multi-sectioned device is comprised of three sections.

3. The protective barrier of claim 1 wherein a cross-sectional shape of the sections of the multi sectional device are taken from a group of a triangle, square, circle, rectangle, semicircle and an oval.

4. The protective barrier of claim 1 wherein each section is hollow and of progressively smaller size so that each progressively smaller section can be inserted into the progressively next larger section to form the telescoping device.

5. The protective barrier of claim 4 wherein each section has a first end with an outwardly projecting flange and a second end with an inwardly projecting lip and each section is inserted into the progressively larger section at its first end with the outwardly projecting flange of a smaller inserted section and the inwardly projecting lip of the larger section forming an interlocking mechanism that prevents the smaller section from being completely removed from the larger section and thus limits movement of the smaller section between a fully open position and a fully closed position and wherein when all of the sections are at the fully closed position the length of the telescoping device is equal to the length of one section and when all of the sections are at the fully open position the length of the device is a multiple of the length of a single section.

6. The protective barrier of claim 1 further comprising a security strap that is securely but detachably connectable to the object to be protected.

7. The protective barrier of claim 6 wherein the security strap acts as an anti-theft device by connecting in a user controllable fashion to the object to be protected.

8. The protective barrier 7 wherein the security strap has a first end that attaches in a permanent fashion to the protective barrier and a second end with a security plate permanently attached to a second end of the security strap and the security strap is of a sufficient length to allow the plate to be closed inside a trunk, door or window of a vehicle, on which the protective barrier is placed, when it is parked and locked.

9. The protective barrier of claim 1 wherein the sections of the barrier are made from a plastic type of material.

10. A magnetic, detachably-securing, variable-length protective barrier for a parked motor vehicle having a side; said protective barrier comprising:
   plural interlocking tubular sections telescoping together, said plural interlocking tubular sections including a largest tubular section, and a smallest tubular section telescopically receivable in a first position inside of said largest tubular section, said smallest tubular section being extensible from said first position to a second position in which said smallest tubular section is substantially exterior to and aligned with said largest tubular section;
   an elongate side wall of said largest tubular section, and a corresponding elongate side wall of said smallest tubular section each including magnets embedded in said side wall and in said corresponding side wall,
   whereby in said second position of said smallest tubular section said detachable securing elements of both said largest tubular section and of said smallest tubular section may confront and detachably secure said protective barrier to the side of the motor vehicle, and distal end portions of the protective barrier may extend across and beyond door edge hinge lines to protect corresponding portions of the vehicle.

11. The protective barrier of claim 10 further including at least a third tubular section intermediate in size and telescopically interposed between said largest tubular section and said smallest tubular section.

12. The protective barrier of claim 11 wherein said third tubular section in a respective first position is disposed within said largest tubular section, and in a respective second position said third tubular section being disposed substantially exterior to and aligned with said largest tubular section.

13. The protective barrier of claim 12 wherein said third tubular section includes a respective elongate side wall corresponding in orientation to said elongate side wall of said largest tubular section and to said corresponding elongate side wall of said smallest tubular section.

14. The protective barrier of claim 13 wherein said elongate side wall of said third tubular section also includes detachable securing elements embedded in said side wall.

15. The protective barrier of claim 14 wherein said smallest tubular section in said first position is also disposed within said third tubular section, and in said second position of said smallest tubular section said smallest tubular section is extensible from within said largest tubular section, and also is substantially extensible from within said third tubular section, whereby said largest tubular section, said third tubular section, and said smallest tubular section all may confront and may detachably secure to the side of said motor vehicle.

* * * * *